(12) United States Patent
Wu

(10) Patent No.: US 8,755,295 B2
(45) Date of Patent: Jun. 17, 2014

(54) APPARATUSES AND METHODS FOR HANDLING MEASUREMENT LOGGING CONFIGURATION

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 110 days.

(21) Appl. No.: 13/227,933

(22) Filed: Sep. 8, 2011

(65) Prior Publication Data

US 2012/0076059 A1 Mar. 29, 2012

Related U.S. Application Data

(60) Provisional application No. 61/386,692, filed on Sep. 27, 2010.

(51) Int. Cl.
*H04L 12/26* (2006.01)

(52) U.S. Cl.
USPC ........... 370/252; 370/329; 370/311; 370/328; 370/336

(58) Field of Classification Search
CPC .............................. H04W 72/04; H04W 40/00
USPC .................. 370/252–254, 328, 336
See application file for complete search history.

(56) References Cited

U.S. PATENT DOCUMENTS

2009/0232118 A1 * 9/2009 Wang et al. .................... 370/338
2009/0275329 A1 * 11/2009 Sokondar et al. ............. 455/434
2010/0195605 A1 * 8/2010 Suzuki et al. ................. 370/329
2011/0002281 A1 * 1/2011 Terry et al. .................... 370/329
2011/0194441 A1 * 8/2011 Jung et al. ..................... 370/252
2011/0195668 A1 * 8/2011 Lee et al. .................... 455/67.11
2012/0044868 A1 * 2/2012 Faccin et al. .................. 370/328
2012/0315890 A1 * 12/2012 Suzuki et al. .............. 455/422.1

FOREIGN PATENT DOCUMENTS

CN 101562777 A 10/2009

OTHER PUBLICATIONS

3GPP, "Technical Specification Group Radio Access Network; Study on Minimization of drive-tests in Next Generation Networks; (Release 9)", 3GPP TR 36.805 V2.0.0 (Dec. 2009), pp. 1-23.
Catt, "Time stamp Improvement for Logged MDT", 3GPP TSG RAN WG2 Meeting #71, R2-104532, Aug. 23-27, 2010, pp. 1-2.
Nokia Siemens Networks, Nokia Corporation, "Open issues related to logged MDT", 3GPP TSG-RAN WG2 Meeting #70bis, R2-103510, Jun. 28-Jul. 2, 2010, pp. 1-4.

* cited by examiner

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

A mobile communication device with a wireless module and a controller module is provided. The wireless module performs wireless transmissions and receptions to and from a service network. The controller module, configured to be in a connected mode, receives a measurement logging configuration message from the service network via the wireless module, and starts a periodic logging timer in response to the measurement logging configuration message. Also, the controller module keeps the periodic logging timer running when leaving the connected mode.

10 Claims, 6 Drawing Sheets

APPARATUSES AND METHODS FOR HANDLING MEASUREMENT LOGGING CONFIGURATION

CROSS REFERENCE TO RELATED APPLICATIONS

This application claims priority of U.S. Provisional Application No. 61/386,692, filed on Sep. 27, 2010, and the entirety of which is incorporated by reference herein.

BACKGROUND OF THE INVENTION

1. Field of the Invention

The invention generally relates to measurement results collection for Minimization of Drive Tests (MDT), and more particularly, to apparatuses and methods for handling measurement logging configuration.

2. Description of the Related Art

In a typical mobile communication environment, a user equipment (UE), including a mobile telephone (also known as a cellular or cell phone), a laptop computer with wireless communications capability, or a personal digital assistant (PDA) etc., may communicate voice and/or data signals with one or more service network. The wireless communications between the UE and the service networks may be performed using various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others. Generally, an operator needs to run manual drive-tests to adjust network settings for performance optimizations, including radio coverage optimization, mobility optimization, network capability optimization, channel optimization, Quality of Service (QoS) verification, network planning, and others. In order to reduce the cost and time consumed for the manual drive-tests, a Minimization of Drive Tests (MDT) concept has been proposed, which requires the user equipment (UE) to log its measurement results and report the measurement logs (referred to herein as MDT logs) to the service network, so that the operator may analyze the MDT logs and adjust the network settings without too much requirement for manual drive-tests.

Take the Universal Mobile Telecommunications System (UMTS) technology in compliance with the 3GPP TS 37.320 specification (referred to herein as the 37.320 specification), 3GPP TS 25.331 specification and 3GPP TS 25.304 specification or Long Term Evolution (LTE) technology in compliance with the 3GPP TS 37.320 specification, the 3GPP TS 36.331 specification, and the 3GPP TS 36.304 specification as an example. After a UE is connected to a UMTS Terrestrial Radio Access Network (UTRAN) or evolved-UTRAN (E-UTRAN) and is configured to be in the RRC_CONNECTED mode, the UTRAN or E-UTRAN may configure the UE for performing logging of measurement results in the RRC_IDLE mode, by transmitting a LoggedMeasurementConfiguration message to the UE, as shown in FIG. 1. The LoggedMeasurementConfiguration message indicates the configuration parameters for periodic MDT logging in the RRC_IDLE mode, including a value for a periodic logging timer, i.e. loggingInterval. When receiving the LoggedMeasurementConfiguration message, the UE starts the periodic logging timer with the indicated value. However, when the UE is later configured to leave the RRC_CONNECTED mode, all running timers except the timer T320 are stopped. Consequently, the UE does not perform periodic MDT logging in the RRC_IDLE mode as it is supposed to do, since the periodic logging timer has been stopped.

BRIEF SUMMARY OF THE INVENTION

Accordingly, embodiments of the invention provide apparatuses and methods for handling measurement logging configuration. In one aspect of the invention, a mobile communication device comprising a wireless module and a controller module is provided. The wireless module performs wireless transmissions and receptions to and from a service network. The controller module, configured to be in a connected mode, receives a measurement logging configuration message from the service network via the wireless module, and starts a periodic logging timer in response to the measurement logging configuration message. Also, the controller module keeps the periodic logging timer running when leaving the connected mode.

In another aspect of the invention, a method for handling measurement logging configuration by a mobile communication device configured to be in a connected mode is provided. The method comprises the steps of receiving a measurement logging configuration message from a service network, starting a periodic logging timer in response to the measurement logging configuration message, and keeping the periodic logging timer running when configured to leave the connected mode.

In yet another aspect of the invention, a mobile communication device comprising a wireless module and a controller module is provided. The wireless module performs wireless transmissions and receptions to and from a service network. The controller module, configured to be in a connected mode, receives a measurement logging configuration message from the service network via the wireless module, and starts a periodic logging timer with a value indicated in the measurement logging configuration message in response to leaving the connected mode.

In still another aspect of the invention, a method for handling measurement logging configuration by a mobile communication device configured to be in a connected mode is provided. The method comprises the steps of receiving a measurement logging configuration message from a service network, and starting the periodic logging timer with a value indicated in the measurement logging configuration message in response to leaving the connected mode.

Other aspects and features of the present invention will become apparent to those with ordinarily skill in the art upon review of the following descriptions of specific embodiments of apparatuses and methods for handling measurement logging configuration.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
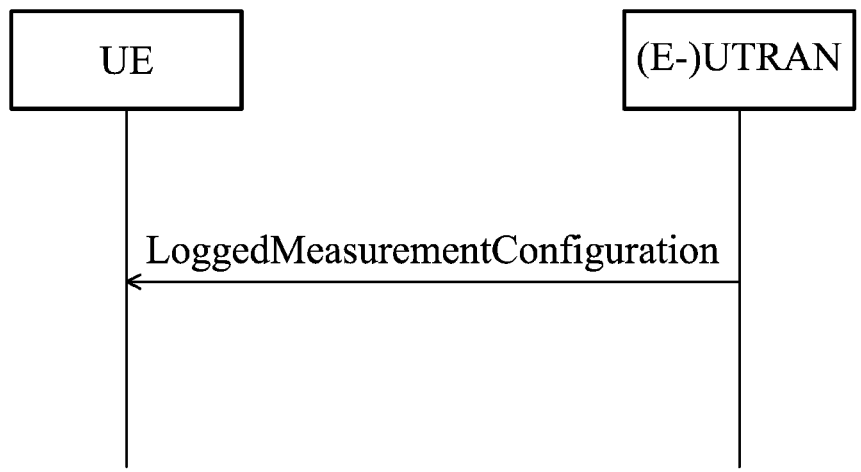
FIG. 1 is a message sequence chart illustrating an MDT measurement configuration procedure.
Figure 2:
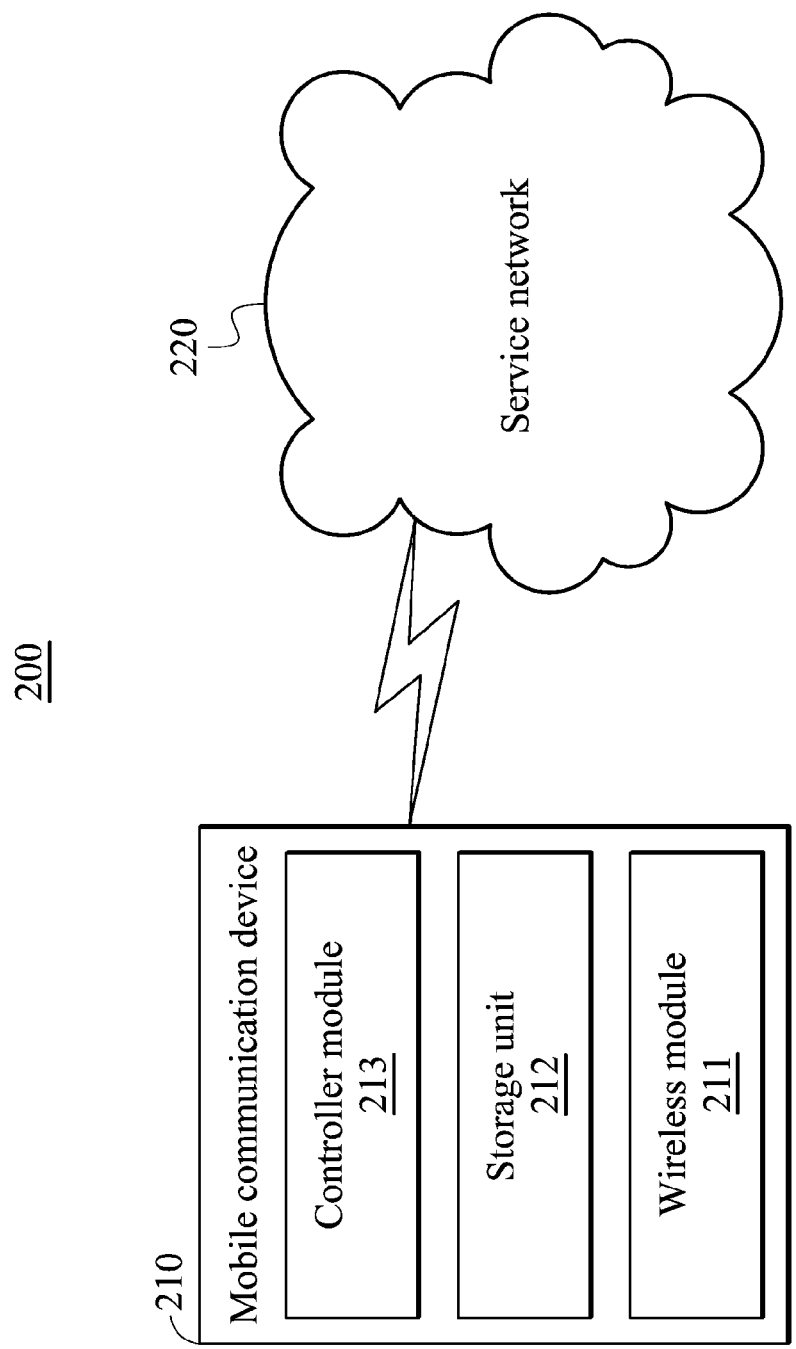
FIG. 2 is a block diagram illustrating a mobile communication environment according to an embodiment of the invention.

FIG. 2 is a block diagram illustrating a mobile communication environment according to an embodiment of the invention. In the mobile communication environment 200, the mobile communication device 210 is wirelessly connected to the service network 220 for obtaining wireless services. The service network 220 may be an E-UTRAN in the LTE technology and an UTRAN in the WCDMA technology. The mobile communication device 210 comprises a wireless module 211 for performing the functionality of wireless transmissions and receptions to and from the service network 220, and a storage unit 212 for storing measurement logs. To further clarify, the wireless module 211 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use. The storage unit 212 may be a magnetic/optical medium, a FLASH memory (e.g., NAND flash memory), or random access memory, etc. Also, the mobile communication device 210 comprises a controller module 213 for controlling the operation of the wireless module 211 and other functional components, such as a display unit and/or keypad serving as the MMI (man-machine interface), a storage unit storing the program codes of applications or communication protocols, or others.

Figure 3:
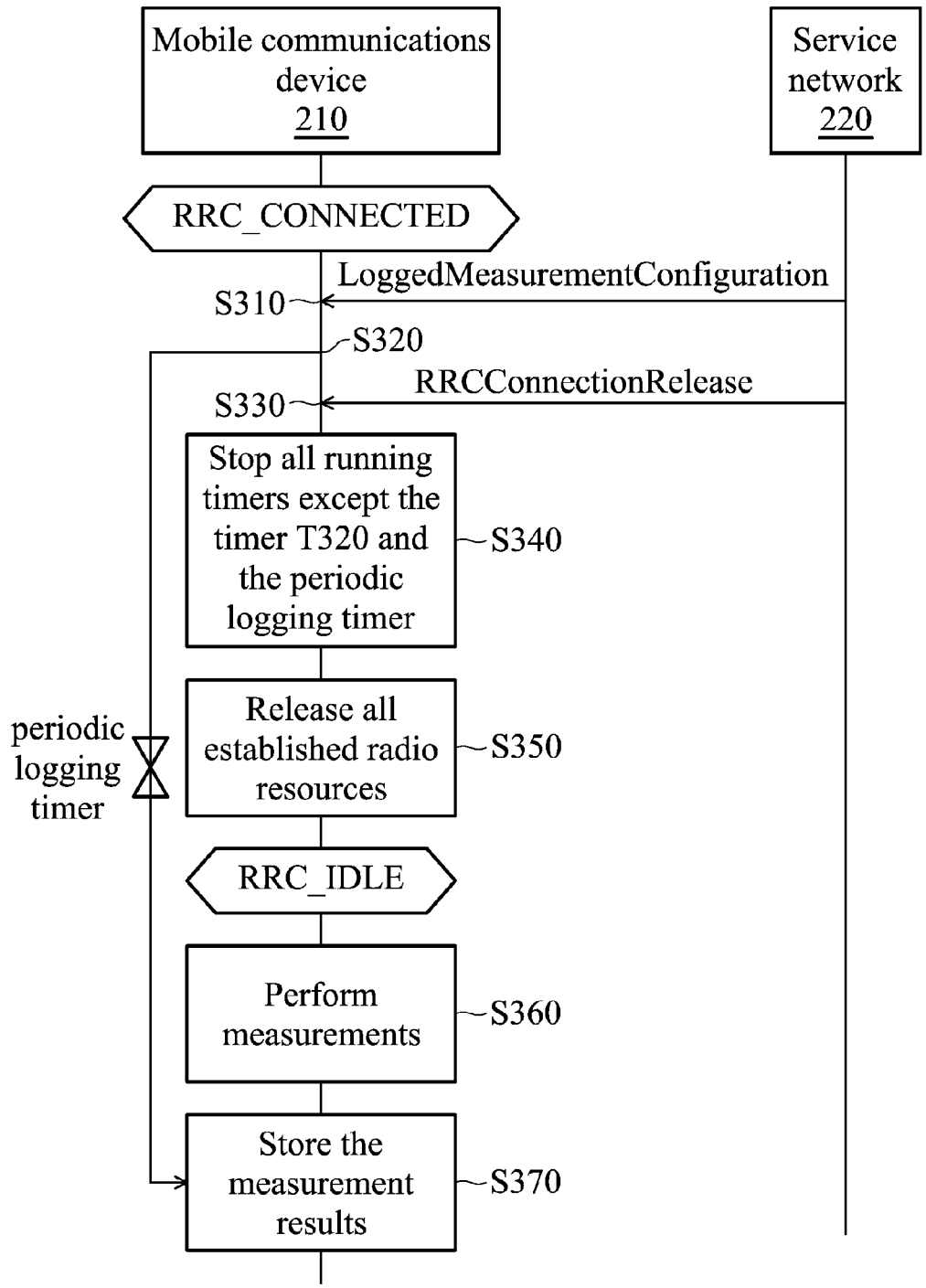
FIG. 3 is a message sequence chart illustrating the configuration of periodic MDT logging according to an embodiment of the invention.

To be more specific, the controller module 213 controls periodic MDT logging in the connected mode and the idle mode. FIG. 3 is a message sequence chart illustrating the configuration of periodic MDT logging according to an embodiment of the invention. In this embodiment, the service network 220 is an LTE system, and the mobile communication device 210 is connected to the service network 220, i.e., the mobile communication device 210 is configured to be in the RRC_CONNECTED mode. To begin, the service network 220 transmits a LoggedMeasurementConfiguration message to the mobile communication device 210 (step S310), wherein the LoggedMeasurementConfiguration message indicates the configuration parameters for periodic MDT logging in the RRC_IDLE mode, including a value for a periodic logging timer, i.e. loggingInterval. When receiving the LoggedMeasurementConfiguration message via the wireless module 211, the controller module 213 starts the periodic logging timer with the value indicated therein (step S320). Later, when the service network 220 decides to release the connection, it transmits an RRCConnectionRelease message to the mobile communication device 210 (step S330). In response to the RRCConnectionRelease message, the controller module 213 stops all running timers except the timer T320 and the periodic logging timer (step S340), and releases all established radio resources (step S350). After all established radio resources have been released, the mobile communication device 210 enters the RRC_IDLE mode and performs measurements in ON durations of Discontinuous Reception (DRX) cycles (step S360). Subsequently, when the periodic logging timer expires, the controller module 213 determines whether the current time is within an ON duration of a DRX cycle. In this embodiment, since the periodic logging timer expired within an ON duration of a DRX cycle, the controller module 213 stores the measurement results collected from the measurements in the storage unit 212 (step S370). In another embodiment, if the periodic logging timer expired within an OFF duration of a DRX cycle, the controller module 213 may delay the MDT logging operation until the next ON duration of a DRX cycle. That is, the mobile communication device 210 may sleep during OFF durations and only perform MDT logging operations during ON durations. Particularly, when the mobile communication device 210 is sleeping during OFF durations, the wireless module 211 and/or other transceiver modules may be operating in a low-voltage mode or may be turned off. Note that, the periodic logging timer gets to be restarted every time after the MDT logging operation is performed, so that the MDT logging operation may be performed periodically.

Figure 4:
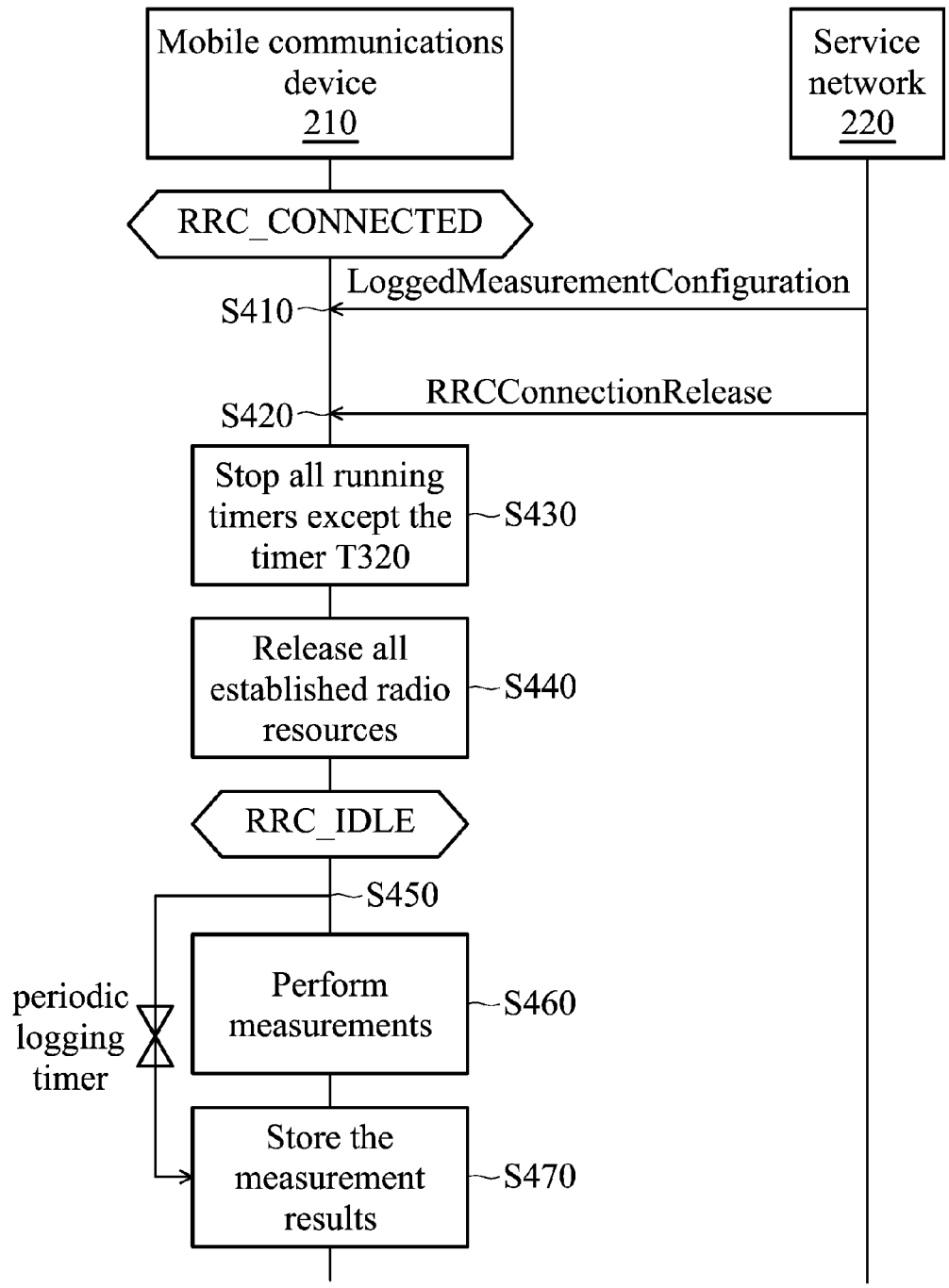
FIG. 4 is a message sequence chart illustrating the configuration of periodic MDT logging according to another embodiment of the invention.

FIG. 4 is a message sequence chart illustrating the configuration of periodic MDT logging according to another embodiment of the invention. Similar to FIG. 3, the service network 220 is an LTE system and the mobile communication device 210 is connected to the service network 220, i.e., the mobile communication device 210 is configured to be in the RRC_CONNECTED mode. To begin, the service network 220 transmits a LoggedMeasurementConfiguration message to the mobile communication device 210 (step S410), wherein the LoggedMeasurementConfiguration message indicates the configuration parameters for periodic MDT logging in the RRC_IDLE mode, including a value for a periodic logging timer, i.e. loggingInterval. When receiving the LoggedMeasurementConfiguration message via the wireless module 211, the controller module 213 does not start the periodic logging timer with the value indicated therein. Instead, the controller module 213 delays the start of the periodic logging timer until it is configured to leave the RRC_CONNECTED mode. Later, when the service network 220 decides to release the connection, it transmits an RRCConnectionRelease message to the mobile communication device 210 (step S420). In response to the RRCConnectionRelease message, the controller module 213 stops all running timers except the timer T320 (step S430) and releases all established radio resources (step S440). After all established radio resources have been released, the mobile communication device 210 enters the RRC_IDLE mode. When entering the RRC_IDLE mode from the RRC_CONNECTED mode, the controller module 213 starts the periodic logging timer with the value indicated in the LoggedMeasurementConfiguration message (step S450). Specifically, the periodic logging timer is started at a first subframe of an ON duration of a DRX cycle, so that the MDT logging operation may be aligned with ON durations in DRX cycles to save power. That is, the mobile communication device 210 may sleep during OFF durations and only perform MDT logging operations during ON durations. Particularly, when the mobile communication device 210 is sleeping during OFF durations, the wireless module 211 and/or other transceiver modules may be operating in a low-voltage mode or may be turned off. When configured in the RRC_IDLE mode, the controller module 213 also requests the wireless module 211 to perform measurements during ON durations of DRX cycles (step S460). Subsequently, when the periodic logging timer expires, the controller module 213 determines whether the current time is within an ON duration of a DRX cycle. In this embodiment, the periodic logging timer expires in an ON duration of a DRX cycle since it was started at a first subframe of an ON duration of a DRX cycle. For the expiration of the periodic logging timer, the controller module 213 stores the measurement results collected from the measurements in the storage unit 212 (step S470). Note that, the periodic logging timer gets to be restarted every time after the MDT logging operation is performed, so that the MDT logging operation may be performed periodically.

Figure 5:
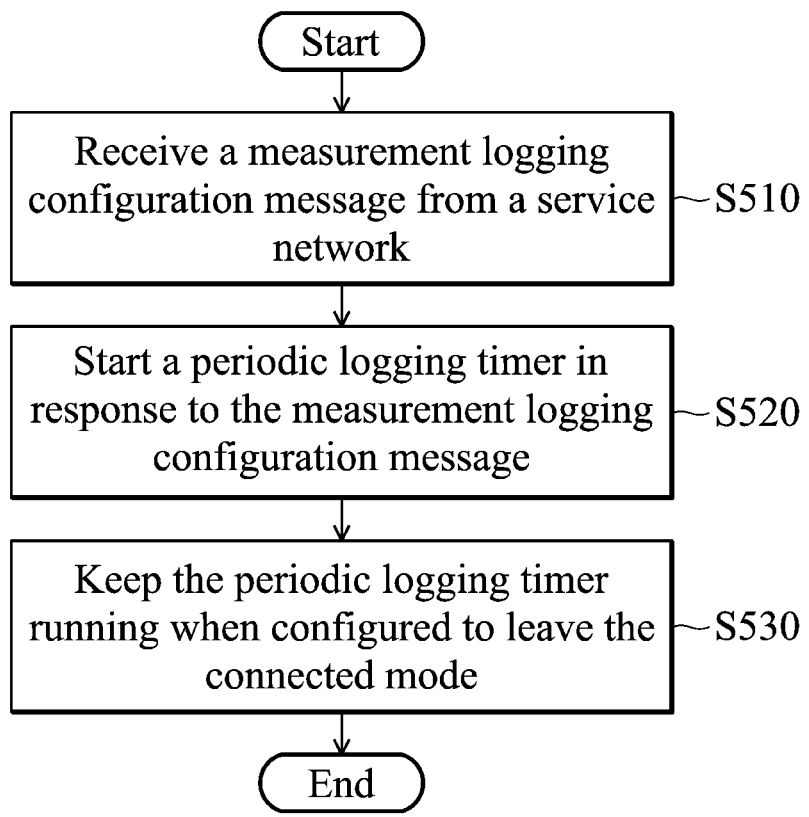
FIG. 5 is a flow chart illustrating the method for handling measurement logging configuration according to an embodiment of the invention.

FIG. 5 is a flow chart illustrating the method for handling measurement logging configuration according to an embodiment of the invention. The method for handling measurement logging configuration may be applied in any mobile communication device supporting the WCDMA technology, the LTE technology, or the LTE-Advanced technology, or more than one of them. Taking the mobile communication device 210 as an example, initially, it is connected to the service network 220 for obtaining wireless services, i.e., the mobile communication device 210 is configured to be in the RRC_CONNECTED mode. To begin, the mobile communication device 210 receives a measurement logging configuration message from the service network 220 (step S510). Specifically, the measurement logging configuration message is a LoggedMeasurementConfiguration message which indicates the configuration parameters for periodic MDT logging in the RRC_IDLE mode, including a value for a periodic logging timer. In response to the measurement logging configuration message, the mobile communication device 210 starts the periodic logging timer (step S520). Next, when the mobile communication device 210 is configured to leave the RRC_CONNECTED mode, it keeps the periodic logging timer running (step S530). In one embodiment, the mobile communication device 210 may be configured to leave the RRC_CONNECTED mode by receiving an RRCConnectionRelease message from the service network 220, wherein the RRCConnectionRelease message indicates the release of all established radio resources. Unlike a conventional UE which stops all running timers except T320 upon leaving the RRC_CONNECTED mode, the mobile communication device 210 keeps the periodic logging timer running, so that the periodic measurement logging may be performed in the RRC_IDLE mode.

In addition, after the mobile communication device 210 has entered the RRC_IDLE mode from the RRC_CONNECTED mode, it may perform measurements during ON durations of DRX cycles. When the periodic logging timer expires, the mobile communication device 210 may further determine whether the current time is within an ON duration of a DRX cycle. If so, the mobile communication device 210 stores the measurement results collected from the measurements in the storage unit 212. If not, the mobile communication device 210 may delay the measurement logging until the next ON duration of a DRX cycle. Therefore, the mobile communication device 210 may only perform measurement logging during ON durations, and sleep during OFF durations to save power.

Figure 6:
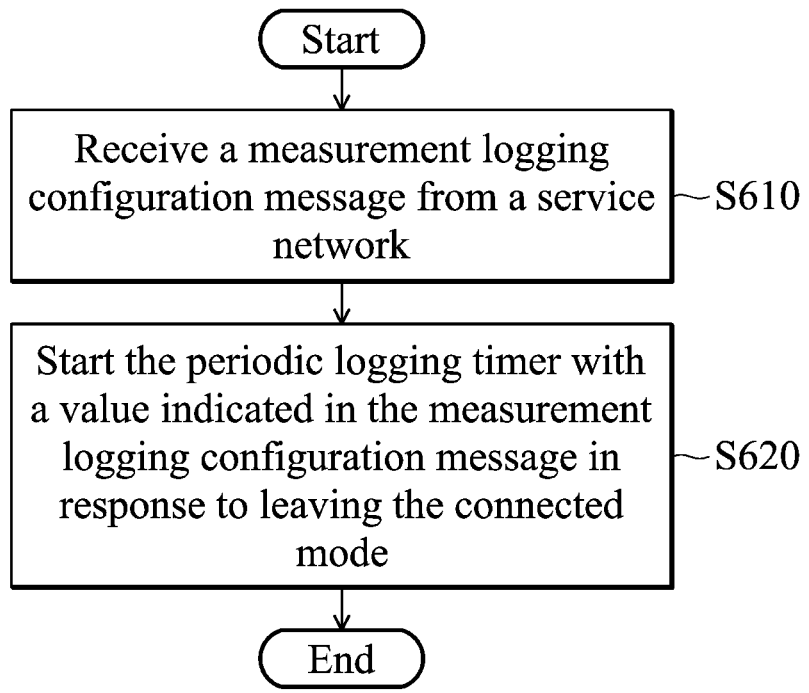
FIG. 6 is a flow chart illustrating the method for handling measurement logging configuration according to another embodiment of the invention.

FIG. 6 is a flow chart illustrating the method for handling measurement logging configuration according to another embodiment of the invention. Similar to FIG. 5, the method for handling measurement logging configuration may be applied in any mobile communication device supporting the WCDMA technology, the LTE technology, or the LTE-Advanced technology, or more than one of them. Taking the mobile communication device 210 as an example, initially, it is connected to the service network 220 for obtaining wireless services, i.e., the mobile communication device 210 is configured to be in the RRC_CONNECTED mode. To begin, the mobile communication device 210 receives a measurement logging configuration message from the service network 220 (step S610). Specifically, the measurement logging configuration message is a LoggedMeasurementConfiguration message which indicates the configuration parameters for periodic MDT logging in the RRC_IDLE mode, including a value for a periodic logging timer. Unlike a conventional UE, the mobile communication device 210 does not start the periodic logging timer when receiving the LoggedMeasurementConfiguration message. Subsequently, when the mobile communication device 210 is configured to leave the RRC_CONNECTED mode, it then starts the periodic logging timer with the value indicated in the LoggedMeasurementConfiguration message (step S620). Specifically, the periodic logging timer is started at a first subframe of an ON duration of a DRX cycle, so that the periodic measurement may be aligned with ON durations in DRX cycles to save power. That is, the mobile communication device 210 may sleep during OFF durations and only perform MDT logging operations during ON durations. In one embodiment, the mobile communication device 210 may be configured to leave the RRC_CONNECTED mode by receiving an RRCConnectionRelease message from the service network 220, wherein the RRCConnectionRelease message indicates the release of all established radio resources. Note that, since the mobile communication device 210 delays the start of the periodic logging timer until it has entered the RRC_IDLE mode, the periodic logging timer may run in the RRC_IDLE mode and the periodic measurement logging may be performed normally in the RRC_IDLE mode.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling measurement logging configuration may be also applied for mobile communication devices and service networks in compliance with any evolutionary technology of the WCDMA/LTE/LTE-Advanced technology. Therefore, the scope of the present invention shall be defined and protected by the following claims and their equivalents.

What is claimed is:

1. A mobile communication device, comprising:
   a wireless module performing wireless transmissions and receptions to and from a service network; and a controller module, configured to be in a connected mode, receiving a measurement logging configuration message from the service network via the wireless module, starting a periodic logging timer in response to the measurement logging configuration message, and keeping the periodic logging timer running when leaving the connected mode, wherein the periodic logging timer is started at a first subframe of an ON duration of a Discontinuous Reception (DRX) cycle, wherein the controller module further determines, when configured to be in an idle mode, whether the periodic logging timer has expired during the ON duration of the DRX cycle, and wherein in response to the periodic logging timer expiring during the ON duration of the DRX cycle, a measurement logging operation is performed by the controller module, and in response to the periodic logging timer not expiring during the ON duration of the DRX cycle, the measurement logging operation is delayed until a next ON duration of the DRX cycle.

2. The mobile communication device of claim 1, wherein the periodic logging timer is started with a value indicated in the measurement logging configuration message.

3. The mobile communication device of claim 1, wherein the measurement logging configuration message is for configuring Minimization of Drive Tests (MDT) during an idle mode of the mobile communication device.

4. A method for handling measurement logging configuration by a mobile communication device configured to be in a connected mode, comprising:

receiving a measurement logging configuration message from a service network;

starting a periodic logging timer in response to the measurement logging configuration message; keeping the periodic logging timer running when configured to leave the connected mode, wherein the periodic logging timer is started at a first subframe of an ON duration of a Discontinuous Reception (DRX) cycle;

determining, when configured to be in an idle mode, whether the periodic logging timer has expired during the ON duration of the DRX cycle, wherein in response to the periodic logging timer expiring during the ON duration of the DRX cycle, a measurement logging operation is performed, and in response to the periodic logging timer not expiring during the ON duration of the DRX cycle, the measurement logging operation is delayed until a next ON duration of the DRX cycle.

5. The method of claim 4, wherein the periodic logging timer is started with a value indicated in the measurement logging configuration message.

6. The method of claim 4, wherein the measurement logging configuration message is for configuring Minimization of Drive Tests (MDT) during an idle mode of the mobile communication device.

7. A mobile communication device, comprising:

a wireless module performing wireless transmissions and receptions to and from a service network; and a controller module, configured to be in a connected mode, receiving a measurement logging configuration message from the service network via the wireless module, and starting a periodic logging timer with a value indicated in the measurement logging configuration message in response to leaving the connected mode, wherein the periodic logging timer is started at a first subframe of an ON duration of a Discontinuous Reception (DRX) cycle, wherein the controller module further determines, when configured to be in an idle mode, whether the periodic logging timer has expired during the ON duration of the DRX cycle, and wherein in response to the periodic logging timer expiring during the ON duration of the DRX cycle, a measurement logging operation is performed, and in response to the periodic logging timer not expiring during the ON duration of the DRX cycle, the measurement logging operation is delayed until a next ON duration of the DRX cycle.

8. The mobile communication device of claim 7, wherein the measurement logging configuration message is for configuring Minimization of Drive Tests (MDT) during an idle mode of the mobile communication device.

9. A method for handling measurement logging configuration by a mobile communication device configured to be in a connected mode, comprising:

receiving a measurement logging configuration message from a service network;

starting the periodic logging timer with a value indicated in the measurement logging configuration message in response to leaving the connected mode, wherein the periodic logging timer is started at a first subframe of an ON duration of a Discontinuous Reception (DRX) cycle; and determining, when configured to be in an idle mode, whether the periodic logging timer has expired during the ON duration of the DRX cycle, wherein in response to the periodic logging timer expiring during the ON duration of the DRX cycle, a measurement logging operation is performed, and in response to the periodic logging timer not expiring during the ON duration of the DRX cycle, the measurement logging operation is delayed until a next ON duration of the DRX cycle.

10. The method of claim 9, wherein the measurement logging configuration message is for configuring Minimization of Drive Tests (MDT) during an idle mode of the mobile communication device.

* * * * *